May 30, 1939.  S. E. THORNTON  2,160,525
LUMBER RIPPING SAW
Filed March 23, 1938
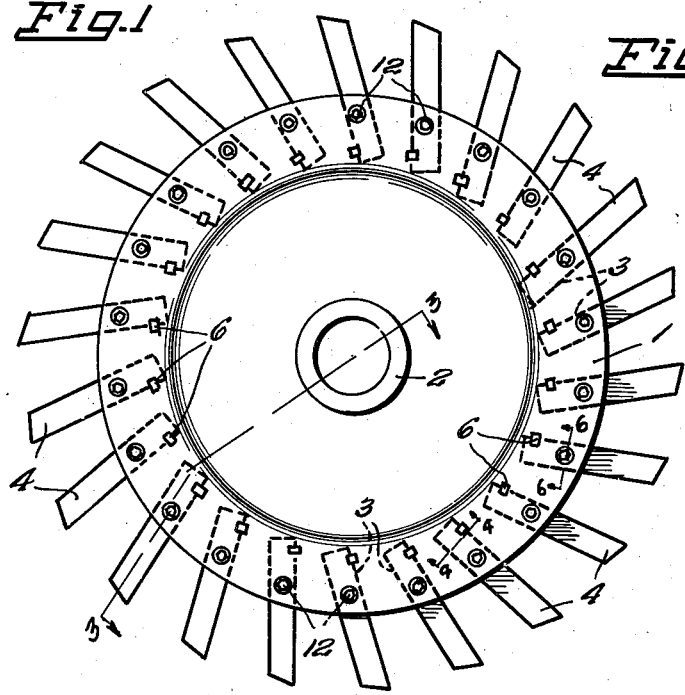
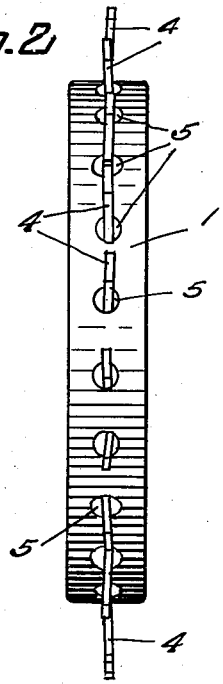
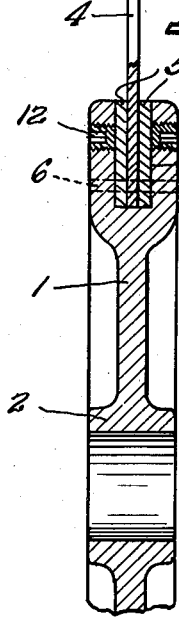
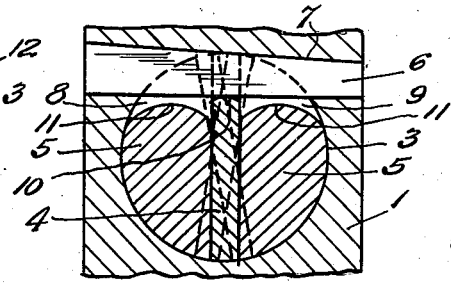
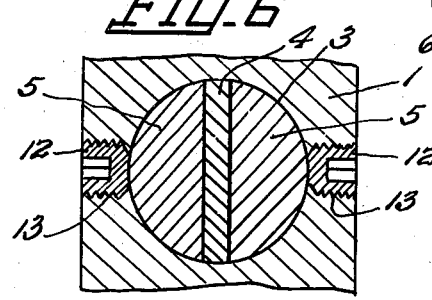
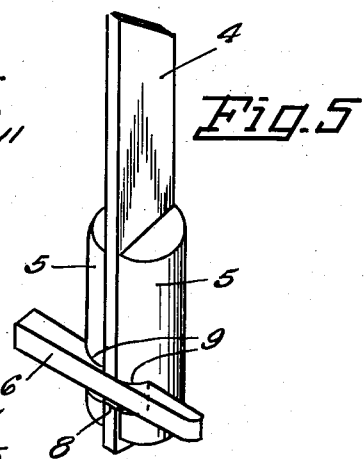
INVENTOR.
Samuel E. Thornton
BY
ATTORNEYS.

Patented May 30, 1939

2,160,525

UNITED STATES PATENT OFFICE 2,160,525

LUMBER RIPPING SAW

Samuel E. Thornton, Coeur d'Alene, Idaho

Application March 23, 1938, Serial No. 197,704

3 Claims. (Cl. 144—235)

This invention relates to a lumber ripping saw and it is one object of the invention to provide a saw provided with improved teeth which are so formed and mounted that they may be angularly adjusted and thus caused to cut the lumber easily and, at the same time, eliminate waste due to too thick a cut.

Another object of the invention is to provide an improved saw including a circular body adapted to be mounted upon an arbor and having its peripheral portion formed with sockets in which the teeth are so mounted that they will be prevented from being shifted out of place by centrifugal force created during use of the saw.

Another object of the invention is to so mount the teeth that while they may be securely held in place after being angularly adjusted, they may be easily removed when renewal of the teeth is necessary.

And a still further object of the invention is to provide a saw which is of simple construction and very easy to assemble and adjust.

The invention is illustrated in the accompanying drawing, wherein:

Fig. 1 is a side elevation of the improved saw.

Fig. 2 is an edge view thereof.

Fig. 3 is a sectional view taken transversely through the saw along the line 3—3 of Fig. 1.

Fig. 4 is a sectional view on an enlarged scale taken along the line 4—4 of Fig. 1.

Figure 5 is a perspective view of one of the teeth, together with the mounting blocks and securing key thereof.

Fig. 6 is a sectional view taken along the line 6—6 of Fig. 1.

This improved saw has a cutter head or body 1 formed as a metal disk which may be of any desired diameter and thickness and at its center is provided with a hub 2 through which an arbor is adapted to pass when the saw is mounted for use. The thick peripheral portion of the body is formed with a plurality of sockets 3 which are so bored that they extend at a tangent instead of radially of the body and these sockets receive the teeth 4 and companion filler blocks 5 which are disposed against opposite side faces of the teeth and of such length that their outer ends terminate flush with the peripheral edge face of the outer head or body. The edge faces of the teeth are curved transversely, as shown in Fig. 6, so that each tooth and set of companion blocks fits snugly into the socket in which they are thrust. As the sockets and combined teeth and blocks are circular in cross section, the teeth and blocks may be turned in the sockets and the teeth angularly adjusted as shown by dotted lines in Fig. 4.

The teeth and blocks must be held in the sockets and prevented from being dislodged by centrifugal force created when the saw is in use. In order to do so, there are employed keys 6 which are tapered, as shown in Fig. 4, and have wedging fit within the tapered passages 7 formed transversely through the body. Recesses 8 and 9 are formed in the teeth and the blocks and register with each other to accommodate the keys, as shown in Figs. 4 and 5, and referring to Fig. 4, it will be seen that the recess 8 of each tooth has a transversely rounded inner wall 10 engaged by the key 6 and the recesses 9 have arcuate inner walls 11 which are spaced from the tooth. Therefore, while the teeth and companion blocks will be firmly held against longitudinal displacement by centrifugal force, limited turning movement may be imparted to them until stopped by engagement of the curved walls 11 with the confronting edge face of the key and the teeth may be angularly adjusted toward the right or left as indicated by the dotted lines in Fig. 4. After the teeth are set they must be held in the adjusted positions to which they have been moved, and in order to do so there have been provided set screws 12 which are screwed into threaded openings or sockets 13 formed in the side portions of the body and, when tightened, frictionally grip the blocks, as shown in Fig. 6. The teeth and blocks will thus be held against turning movement and movement of the teeth out of adjusted position prevented. When it is desired to remove the teeth it is merely necessary to loosen the set screws and turn the teeth to the position shown in full lines in Fig. 4, after which the keys may be extracted and the teeth and blocks shifted longitudinally out of the sockets 3. I have, therefore, provided a saw having teeth so mounted that they may be easily applied or removed and, in addition, have provided the saw with teeth capable of being angularly adjusted toward the right or left, as shown in Fig. 2, and the teeth caused to form a cut of the desired width when the saw is in operation.

Having thus described the invention, what is claimed is:

1. A saw comprising a circular cutter head having inclined sockets leading inwardly from its peripheral edge face, teeth seated in said sockets, filler blocks in said sockets at opposite sides of said teeth, the teeth and blocks being adapted to be turned in the sockets to angularly adjust the teeth transversely of the peripheral edge face of the cutter head, each tooth and its companion blocks being formed with registering transversely extending recesses, the recesses of said blocks being of greater depth than the recesses of the teeth, keys passing through said cutter head and through the sockets and the recesses of the teeth and blocks, and set screws carried by the cutter head for engaging the blocks and frictionally holding the blocks and teeth in angularly adjusted position.

2. A saw comprising a cutter head formed with sockets leading from its peripheral edge face, blades mounted in said sockets and formed with side faces, blocks in said sockets engaging opposite side faces of said blades and adapted to be turned in the sockets with the blades to angularly adjust the blades, the blades and blocks being formed with registering recesses and said cutter head being formed with transverse openings communicating with the sockets at the recesses, the recesses of the blocks being of greater depth than the recesses of the blades and having arcuate walls at opposite sides of the blades, keys removably mounted through said openings and engaged through the recesses to prevent longitudinal shifting of the blades and blocks and limit turning adjustment of the blades and the blocks in the sockets by engagement with the arcuate walls of the recesses of the blocks, and means for securing the blades and blocks in angularly adjusted positions.

3. A saw comprising a cutter head formed with sockets leading from its peripheral edge face, blades mounted in said sockets, filler blocks in said sockets engaging opposite sides of said blades and being turnable in the sockets with the blades to angularly adjust the blades, the blocks and blades being formed with recesses and the cutter head having transverse openings communicating with the sockets at the recesses, the recesses of the blocks being of greater depth than the recesses of the blades, and wedge-shaped keys passed through the openings and recesses to prevent longitudinal displacement of the blades and blocks while allowing turning adjustment of the blocks and the blades.

SAMUEL E. THORNTON.